US011379295B1

(12) United States Patent
Woodhouse

(10) Patent No.: US 11,379,295 B1
(45) Date of Patent: Jul. 5, 2022

(54) RECOVERY PROTOCOLS FOR SYSTEM MALFUNCTIONS IN VIRTUAL COMPUTING ENVIRONMENTS

(71) Applicant: Amazon Technologies, Inc., Seattle, WA (US)

(72) Inventor: David William Martin Woodhouse, Great Bardfield (GB)

(73) Assignee: Amazon Technologies, Inc., Seattle, WA (US)

(*) Notice: Subject to any disclaimer, the term of this patent is extended or adjusted under 35 U.S.C. 154(b) by 539 days.

(21) Appl. No.: 16/412,836

(22) Filed: May 15, 2019

(51) Int. Cl.
*G06F 11/07* (2006.01)
*G06F 9/455* (2018.01)

(52) U.S. Cl.
CPC ...... *G06F 11/0793* (2013.01); *G06F 9/45558* (2013.01); *G06F 11/0712* (2013.01); *G06F 11/0751* (2013.01); *G06F 2009/45583* (2013.01)

(58) Field of Classification Search
CPC ....... G06F 2009/45583; G06F 9/45558; G06F 11/0793; G06F 11/0751; G06F 11/0712; G06F 11/0766; G06F 11/1417; G06F 11/1438; G06F 11/1442
See application file for complete search history.

(56) References Cited

U.S. PATENT DOCUMENTS

| 9,411,667 | B2* | 8/2016 | Jayakumar | G06F 11/0712 |
|---|---|---|---|---|
| 9,892,256 | B1* | 2/2018 | Lango | G06F 21/53 |
| 10,872,099 | B1* | 12/2020 | Gharpure | G06F 16/27 |
| 2005/0172305 | A1* | 8/2005 | Baumberger | G06F 9/468 719/327 |
| 2006/0005188 | A1* | 1/2006 | Vega | G06F 9/5077 718/1 |
| 2007/0006226 | A1* | 1/2007 | Hendel | G06F 11/3636 718/1 |
| 2011/0035618 | A1* | 2/2011 | Jann | G06F 11/0793 711/170 |
| 2011/0246986 | A1* | 10/2011 | Nicholas | G06F 9/45545 718/1 |
| 2012/0081355 | A1* | 4/2012 | Post | G06T 15/005 345/419 |
| 2013/0227554 | A1* | 8/2013 | Tsirkin | G06F 9/45558 718/1 |
| 2016/0012009 | A1* | 1/2016 | Banikazemi | G06F 11/1456 714/4.11 |
| 2016/0283301 | A1* | 9/2016 | Govindarajalu | G06F 11/079 |
| 2016/0313986 | A1* | 10/2016 | Liguori | G06F 8/658 |

(Continued)

*Primary Examiner* — Matthew M Kim
*Assistant Examiner* — Indranil Chowdhury
(74) *Attorney, Agent, or Firm* — Knobbe Martens Olson & Bear LLP

(57) ABSTRACT

Generally described, the present disclosure relates to the use of a virtual machine monitor to instruct one or more virtual processing units belonging to a malfunctioning virtual machine instance to pause processing. While paused, the virtual machine monitor may store the register data of the virtual processing units to virtual memory of the virtual machine instance (e.g., perform a register dump on behalf of the virtual processing units of the malfunctioning virtual machine instance). The virtual machine monitor may then instruct virtual processing units to reinitialize and invoke protected software (e.g., a crash kernel) from virtual memory in an effort to recover from virtual memory the register data dumped there by the VM monitor.

20 Claims, 6 Drawing Sheets

(56) References Cited

U.S. PATENT DOCUMENTS

| | | | | |
|---|---|---|---|---|
| 2017/0249178 A1* | 8/2017 | Tsirkin | ............ | G06F 11/362 |
| 2018/0336085 A1* | 11/2018 | Hammer | ............ | G06F 9/45558 |
| 2019/0056985 A1* | 2/2019 | Farkas | ............ | H04L 41/0654 |
| 2020/0183795 A1* | 6/2020 | Xie | ............ | G06F 11/1482 |
| 2020/0310785 A1* | 10/2020 | Liguori | ............ | H04L 49/70 |

* cited by examiner

RECOVERY PROTOCOLS FOR SYSTEM MALFUNCTIONS IN VIRTUAL COMPUTING ENVIRONMENTS

BACKGROUND

Generally described, computing devices utilize communication networks to exchange data. Companies and organizations operate these networks to support operations and facilitate data exchanges. The computing systems can be located in a single geographic location or located in multiple, distinct geographic locations (e.g., interconnected via private or public communication networks). To facilitate increased utilization, virtualization technologies may allow a single physical computing device to host one or more instances of virtual machines that appear and operate as independent computing devices. With virtualization, software applications running on the physical computing device can create, maintain, delete, or otherwise manage virtual machine instances in a dynamic manner. During a system malfunction of a virtual machine instance, a computing system risks entering an unrecoverable state, whereby data of the computing system may become corrupt and/or altogether wiped from memory.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
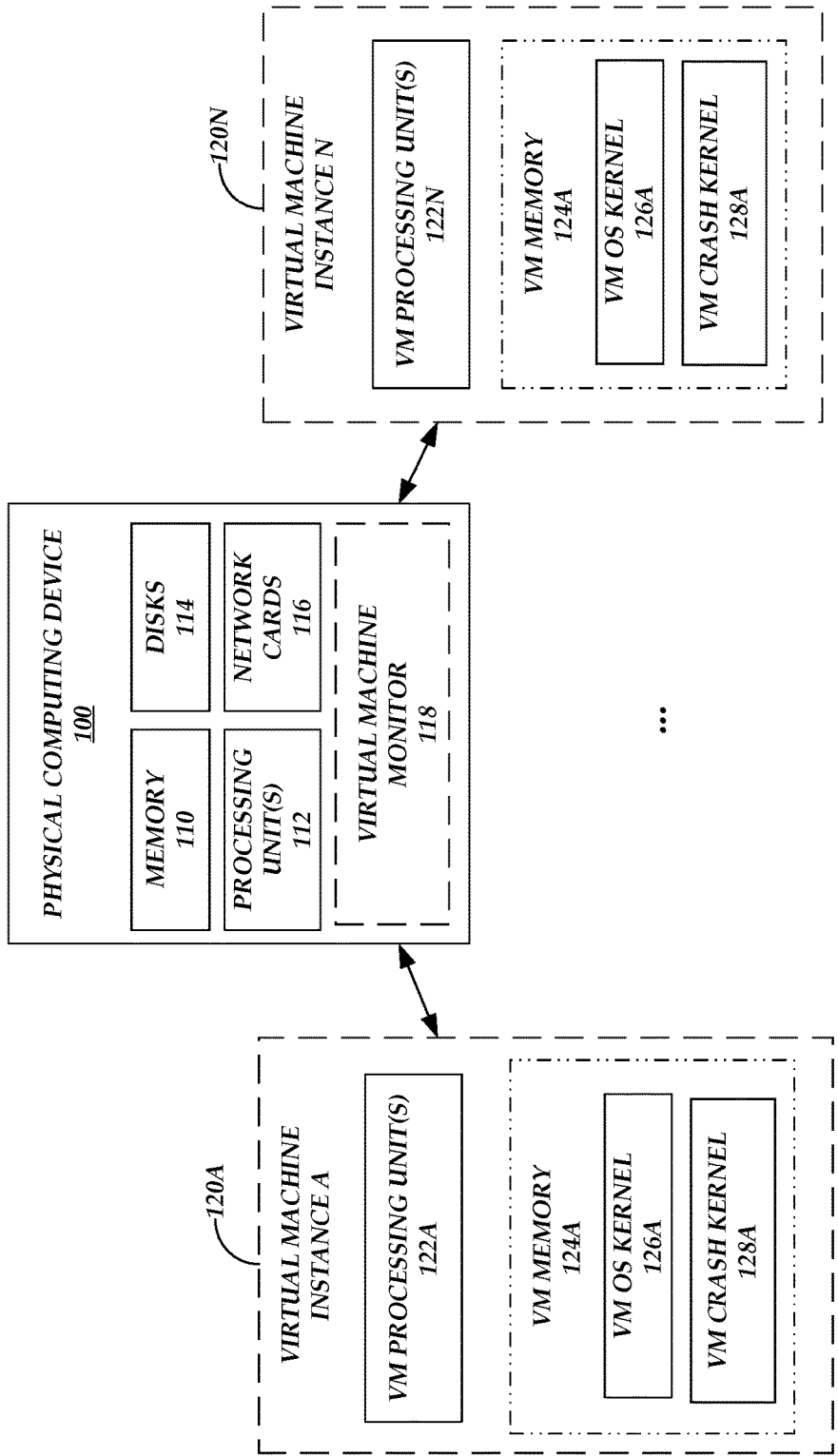
FIG. 1 is a block diagram depicting an example computing environment, including a physical computing device hosting a plurality of virtual machine instances and implementing a virtual machine monitor, in which various embodiments of the present disclosure can be implemented.

The systems, methods, and devices described herein each have several aspects, no single one of which is solely responsible for its desirable attributes. Without limiting the scope of this disclosure, several non-limiting features will now be discussed briefly.

Generally described, the present disclosure relates to recovery protocols for computing systems in a virtual computing environment. Specifically, a virtual machine (VM) monitor or virtual resource monitor (a.k.a., a "hypervisor") may be implemented to manage one or more VM instances in the virtual computing environment and may be utilized to facilitate recovery and debugging efforts when a VM instance in such an environment experiences a system malfunction (e.g., triple fault, internal fatal error, crash, deadlock, etc.). For example, a VM monitor may comprise an embedded, hosted, native, or bare metal hypervisor configured to instantiate and subsequently monitor one or more VM instances.

Generally, a VM monitor may be software, firmware, or hardware that creates and runs VM instances. A VM monitor can associate and manage virtual computing resources (e.g., a virtual machine configured to appear and operate as a personal computer or other specific type of computer) or virtual components for VM instances (e.g., virtual processing resources, virtual memory resources, and virtual input/output (I/O) resources). Although referred to as virtual components, the instantiation and operation of the virtual components requires computing resources of a physical computing device to implement. As such, the VM monitor will manage virtual components for each instantiated VM instance on a physical computing system. As a result, physical computing resources may be consumed to support the instantiated virtual components of each instantiated VM instance. Accordingly, a physical computing system may comprise multiple physical computing devices that host one or more VM instances. The physical computing system that hosts one or more VM instances may be referred to as a host and a VM instance may be referred to as a guest of a particular host.

The computing system stores operating system (OS) software in memory (e.g., one or more OS kernels, guest kernels, core code, etc.), which can either be stored on the host's memory, the guest's memory, or both, depending on the computing system's architecture. For example, OS software may be loaded into a host's memory, while other OS software may be loaded into a region of virtual memory belonging to a guest. The OS software provides functionality for the computing system to carry out core operations and may be configured or designed to comprise as little memory as is practical. The OS software may be executed by the central processing units (CPUs) of a computing system or by virtual processing units (vCPUs) of a VM instance. In a non-limiting example, an OS kernel may be configured to manage certain hardware, processors, memory, disks, drives, network interfaces, timing, etc.

In some embodiments, the OS software may comprise a custom OS kernel for each VM instance, or alternatively, one that is applicable across multiple VM instances. A single instance of an OS kernel for a VM instance may be applicable or similarly emulated as part of the host computing system. In other embodiments, each system, virtual machine or otherwise, may run on a single OS kernel that is specific to the particular system. In addition, an OS kernel may be emulated in an allocated region of virtual memory, in much the same way that other virtual components may be emulated to support one or more instantiated VM instances.

In the context of virtual machine computing, the term "emulate" generally refers to a computer system that imitates or reproduces another system. For example, operating system software may be emulated on different computer systems that may not have been specifically designed to host the emulated software. In a non-limiting example, software emulator applications may be used to run an operating system, such as Windows, on a Macintosh computer. Emulation may be done with hardware, software, or a combination of the two. In another non-limiting example, computer memory hardware may be emulated to imitate the configuration of another memory device. The emulated memory may be referred to as virtual memory.

In addition, another type of software known as a "protected program" (e.g., a crash kernel, crash code, etc.) may be designed as a failsafe to preserve a computing system during a system malfunction. This software may be stored in a protected area of virtual memory that may be referenced during a system malfunction. As such, the protected software may occupy as little memory as possible whilst being able to execute specific tasks in an effort to preserve or recover a failing computer system. For example, the protected software may comprise as few instructions as needed to initialize a disk or network device driver and write out a state of the malfunctioning system for subsequent analysis. As discussed above with respect to the OS software, the protected program may be loaded into the host's memory and emulated for each instantiated VM instance. In a non-limiting example, a crash kernel may be loaded into each instance of VM memory, where the crash kernel may be customized for one or more of the VM instances. In addition, the physical host may have a crash kernel loaded into the host's physical memory. In other embodiments, the crash kernel or a copy of the crash kernel for each VM instance or for the host may be stored on a separate memory device (e.g., another networked server) for facilitating data recovery during a system malfunction.

When the OS software detects, or otherwise receives an indication of, a system malfunction, it may attempt to invoke the protected software in an effort to preserve or recover data and facilitate debugging of the malfunctioning system. Thus, when the OS software detects, or otherwise receives an indication of, a system malfunction, it will attempt to pass control to the protected software. For example, the OS software may interrupt the CPU of a crashing system and instruct it to pause itself, save its register data to memory (e.g., a register dump), and reinitialize its system hardware as necessary. In such examples, a CPU may then be reinitialized, locate the protected software code or program from memory, execute the program code of the protected software, and initiate recovery and debugging efforts for the system. This transition process, however, can be unreliable because the OS software may become corrupt as a result of the system malfunction and may be unable to successfully invoke the protected software. For example, if the OS software has suffered memory corruption, then the CPU instructions which pass control to the protected software, and any data required for that task, may also be corrupt and unable to complete the transition or even initiate the recovery process at all. In addition, the OS software may not be able to locate the protected software due to problems caused by the particular system malfunction and thus, may not be able to invoke the protected software to allow for the debugging or recovery process to commence.

The aforementioned technical problems, among others, are addressed in some embodiments by the disclosed implementation of a VM monitor. Specifically, a VM monitor may be utilized during a system malfunction of a VM instance to perform a recovery protocol in an effort to preserve or recover data from a malfunctioning system. This may be done whilst decreasing reliance on software of the malfunctioning system itself, such as the OS software of a failing VM instance. More specifically, the VM monitor may perform steps to initiate the dump of register data and invoke the protected software without assistance from the OS kernel. As used herein, register data refers to the copy of the virtual machine's memory that is "dumped" (e.g., saved to a designated location) in response to crash detection. This register data represents the state of the VM processing units (e.g., vCPUs) at the time of, or just prior to, the system malfunction. In various implementations, a register dump may include a complete memory dump (e.g., a copy of all the data used by the virtual machine in volatile memory) or a dump of a smaller subset of the memory, for example by including memory allocated to the kernel and vCPU state, and by omitting unallocated memory and/or memory allocated to user applications.

In a non-limiting example, the VM monitor, upon being triggered, may instruct one or more vCPUs belonging to the malfunctioning VM instance to pause processing. While paused, the VM monitor writes the register data of the vCPUs to virtual memory (e.g., perform a register dump on behalf of the vCPUs of the malfunctioning VM instance). The VM monitor may then instruct vCPUs to reinitialize and invoke protected software (e.g., a crash kernel) from virtual memory in an effort to recover the register data from virtual memory that was dumped there by the VM monitor.

For example, when a VM instance is first instantiated or launched, its OS software may send a location and/or start address of its crash kernel to the VM monitor for future use in case the VM instance experiences a system malfunction. Accordingly, if the VM instance malfunctions at a later time, the VM monitor, among other things, will be able to locate the crash kernel and trigger its execution on behalf of the VM instance. The VM monitor may receive an indication of a system malfunction of a VM instance from the malfunctioning VM instance itself of from another VM instance. For example, the VM processing units of the VM instance executing the OS software, such as an OS kernel, may detect a triple fault or the invocation of another recovery routine (e.g., a kernel panic recovery routine). The VM instance may then communicate an indication of the system malfunction to the VM monitor (e.g., via a call, such as a hypervisor call, a message signaled interrupt (MSI), etc.). In other examples, a second VM instance may detect a system malfunction, such as a deadlock, in a first VM instance and send the VM monitor an indication of the system malfunction in the first VM instance.

Following receipt of the indication of a system malfunction in a VM instance, the VM monitor, and not the vCPUs of the malfunctioning VM instance itself, may then instruct one or more of the vCPUs of the malfunctioning VM instance to stop processing. In addition, the VM monitor, on behalf of the malfunctioning vCPUs, may store or write the register data of the vCPUs of the malfunctioning VM instance to a location in virtual memory of the VM instance, or in some cases, in another memory location known to the VM monitor, such as the virtual memory of another, healthy VM instance. In yet other cases, the VM monitory may directly access physical memory, such as the physical computing device hosting the malfunctioning VM instance or another physical memory device (e.g., a memory disk or solid-state memory) and write the register date of the vCPUs thereto. In the latter cases, the physical memory may not be unassociated with the malfunctioning VM instance or any other VM instance. Any such location in such virtual or physical memory may be referred to herein as a "known location" or "known memory location."

Once the register dump is complete, the VM monitor may instruct the vCPUs of the VM instance to reinitialize and invoke the crash kernel at the location and/or start address that the VM instance provided the VM monitor before the VM instance experience a system malfunction. The implementation of a VM monitor to invoke protected software, such as a crash kernel, provides numerous technical advantages, especially in the context of a malfunction of a computer system, where data recollection and analysis may be imperative to diagnosing the system malfunction. For example, as discussed above, the OS kernel may be unreliable during a system malfunction to invoke trusted or protected software from memory because the OS kernel may be corrupt as a result of the system malfunction. The disclosed VM monitor implementation provides a reliable means of invoking a protected program during a system malfunction. Other embodiments of the disclosed technology provide technical benefits in a virtualized system where memory or processing resources may be underutilized during a system malfunction and only parts of the system are failing, but other parts are healthy enough to provide additional lifeline support.

The VM monitor implementation may also advantageously allow a VM monitor to add addresses to virtual memory of a VM instance so that the VM monitor can store the register data of vCPUs of the VM instance to these added addresses or "added/additional memory" in the case of a system malfunction. For example, the VM monitor may write all or a portion of the vCPUs' register data to the added memory. In addition, the VM monitor may store a copy of the VM crash kernel for the VM instance in the added memory. In some embodiments, the added memory may be located elsewhere, e.g., in the virtual memory of another VM instance, or on a separate server or physical storage device. For example, the VM monitor may, before or during a system malfunction, setup added memory on a separate computing device so that the VM monitor can write the register data of the VM processing units elsewhere for subsequent analysis. Such register data represents the state of the VM processing units (e.g., vCPUs) at the time of, or just prior to, the system malfunction.

In another embodiment, a VM monitor may offer a control API to a user, where the user can manually or automatically call the API to facilitate the recovery routine during a system malfunction or to assist with debugging efforts. As used herein, a user generally refers to an end user (e.g., a human or client), an artificial intelligence entity, or the end-user device itself (e.g., a desktop computer, mobile phone, laptop, tablet, etc.). In a non-limiting example, a VM monitor may offer an executable API call to a user that would cause the vCPUs to freeze operation as part of the recovery routine, at which point, the VM monitor may conduct a register dump of the vCPUs at the behest of the user during a system malfunction. In some instances, the API call may be automatically executed, for example, where the type of system malfunction warrants prompt execution.

Various aspects of the disclosure will now be described with regard to certain examples and embodiments, which are intended to illustrate but not limit the disclosure. While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to illustrative components of a host computing device implementing a VM monitor or a guest of the host computing device, one or more aspects of the present disclosure can be applied with regard to different types or configurations of physical computing devices or combinations thereof. For example, although described in the context of a single physical computing device running multiple VM instances, the disclosed VM monitor techniques may be implemented across multiple physical computing devices, such that a malfunctioning VM instance running on a first computing device may interact with a VM monitor running on a second computing device.

Overview of Example Virtualization Environment

FIG. 1 illustrates an embodiment of a physical computing device 100 configured to host one or more VM instances 120A-120N. The physical computing device 100 can correspond to a wide variety of devices, such as servers, that include a wide variety of software and hardware components and configurations. The physical computing device 100 can include a local data store (not shown), or be configured to communicate with a data store over a network (not shown).

The physical computing device 100 includes a VM monitor 118. In some embodiments, the VM monitor 118 operates in a partition of the physical computing device 100, which is separate and isolated from VM instances 120A-120N. The physical computing device 100 includes physical memory 110, which may correspond to any combination of volatile or non-volatile computer-readable storage media. The memory 110 may store information which includes various programs, program data, and other modules. The programs stored in the memory 110 can include a VM monitor 118 software application that can manage the VM instances 120A-120N (e.g., by allocating memory to each VM instance and scheduling virtual processors to run on physical processors). In addition, the physical computing device 100 includes one or more physical processing units 112 (e.g., CPUs), one or more disks 114 (e.g., hard disk, removable disk, or other volatile or nonvolatile storage medium), and one or more network cards 116 (e.g., wired, wireless, etc.). The processing units 112 may be, for example, one or more general purpose microprocessors. In addition, a physical computing device 100 may include a bus or other communication mechanism for communicating information, and a hardware processor or multiple processing units 112, coupled with the bus for processing information.

For example, physical computing device 100 may include a main memory unit 110, such as a random access memory (RAM), cache and/or other dynamic storage devices, coupled to a bus for storing information and instructions to be executed by the processing units 112. Main memory 110 may be used for storing temporary variables or other intermediate information during execution of instructions. Such instructions, when stored in storage media accessible to processing units 112, render physical computing device 100 into a special-purpose machine that is customized to perform the operations specified in the instructions. In some embodiments, the VM monitor 118 or one or more components of VM monitor 118 may be implemented within physical computing device 100, as well as the VM instances themselves. Physical computing device 100 may further include a read only memory (ROM) or other static storage device for storing static information and other instructions. A storage device, such as a magnetic disk, solid-state drive, optical disk, or USB thumb drive (e.g., flash drive), etc., may be provided and coupled to a bus for storing information and instructions.

Various forms of non-transitory computer-readable storage media may be involved in carrying out one or more sequences of one or more computer-readable program instructions to processing units 112 or VM processing units 122A-122N for execution. For example, the instructions may initially be carried on a magnetic disk or solid-state drive of a remote computer. The remote computer can load the instructions into its dynamic memory and send the instructions over a network. The physical computing device 100 may also include a communication interface that provides two-way data communication to and from the network. For example, a communication interface may be an integrated services digital network (ISDN) card, cable modem, satellite modem, or a modem to provide a data communication connection to a corresponding type of telephone line. As another example, the communication interface may be a local area network (LAN) card to provide a data communication connection to a compatible LAN (or WAN component to communicate with a WAN). Wireless links may also be implemented. In any such implementation, the communication interface sends and receives electrical, electromagnetic or optical signals that carry digital data streams representing various types of information.

Network cards 116 typically provide data communication through one or more networks to other data devices. For example, a network card 116 may provide a connection through a local network to a host computer or to data equipment operated by an Internet Service Provider (ISP). Physical computing device 100 can send messages and receive data, including program code, through network(s), network cards 116 and communication interfaces. In the example of the Internet, the remote computer might transmit a requested code for an application program to the physical computing device. The received code may be executed by the processing units 112 as it is received, and/or stored in storage device or memory 110 for later execution.

The physical computing device 100 may be capable of hosting a plurality of VM instances 120A-120N. The VM monitor 118 can manage VM instances 120A-120N hosted on the physical computing device 100. Illustratively, the management of the VM instances 120A-120N can include the instantiation of the VM instance and the instantiation of virtual components utilized in the execution of the VM instance. Additionally, the management of the VM instances 120A-120N can further include the management of interaction between the VM instances 120A-120N and an offload device. For example, an offload device (not shown) may host and emulate one or more virtual components that are used by the instantiated VM instances 120A-120N substantially independent of one or more of the physical computing device 100 resources. In the illustrated embodiment, the physical computing device 100 includes two instantiated, or hosted, VM instances, VM instance "A" (120A) and VM instance "N" (120N). One skilled in the relevant art will appreciate, however, that the physical computing device 100 can host any number of VM instances and is not limited to the hosting of the two VM instances illustrated in FIG. 1.

The physical computing device 100 can be dynamically reconfigurable, such that the virtual components can be removed, changed, added, or otherwise reconfigured to address the configuration of the VM instances 120A-120N on the physical computing device 100. In accordance with an illustrative embodiment, at least some portion of the virtualized components hosted on the physical computing device 100 or on another device, such as an offload device, correspond to virtual I/O components configured to execute I/O functionality on behalf of instantiated VM instances.

Generally described, the VM monitor 118 executed on the physical computing device 100 is configured to manage various aspects associated with instantiated VM instances 120A-120N. In an embodiment, the management operations can be split between the VM monitor and a management domain, such as a Domain-0, that runs on physical computing device 100. In yet another embodiment, all or portions of the programs that run within Domain-0 can instead run on an offload device. The VM monitor 118 can be executed directly on the physical computing system hardware. The VM monitor can function like a host operating system for the physical computing device 100. The VM monitor 118 can control the hardware of the physical computing device 100 and manage and configure VM instances 120A-120N running on the physical computing device 100. The VM monitor 118 can implement management functions that provide direct access to the hardware of the physical computing device 100.

To support hosted VM instances 120A-120N, the VM monitor 118 can instantiate guest domains on the physical computing device 100 for each VM instance by allocating the guest domain memory and time on the physical CPUs. As previously described, the allocated virtual resources may include three primary virtualized resources that are utilized by the instantiated VM instances 120A-120N, namely, virtual processing resources, virtual memory resources, and virtual I/O resources. In some embodiments, the configuration of the VM instances 120A-120N can be determined by a control plane manager (not shown). In some embodiments, the VM monitor 118 can determine the configuration of the VM instances 120A-120N.

Each VM instance 120A-120N may be provisioned virtual resources that are implemented by the physical computing resources of the physical computing device 100. For example, VM instance 120A can be allocated on or more VM processing units 122A and a virtual memory 124A that represent logically provisioned allocations of underlying computing resources of the physical computing device 100 (e.g., physical processing units 112 and memory 110). In some examples, multiple VM processing units can be described as comprising a VM processing unit including multiple virtual processors or vCPUs. Some of the virtual resources, such as virtual I/O resources, can be offloaded to an offload device. The configuration of the virtualized resources for each VM instance 120A-120N can vary. For example, VM instance 120A and VM instance 120N can have different allocations of virtualized computing resources.

The VM instances 120A-120N may be provisioned to provide a variety of different desired functionalities depending on the needs of a data center or user. Examples of the types of desired functionality can include, but are not limited to: database management, serving or distributing data or content (e.g., web servers), managing load balancing or network resources, managing network connectivity or security, providing network addressing information, managing client or server redirection, or other functionalities. Otherwise, the VM instances 120A-120N may be provisioned generically when a desired functionality is not specified or is otherwise not available. The VM monitor 118 is responsible for the provisioning of virtual I/O component groups for each of the VM instances 120A-120N. The virtual components can be logically grouped based on their association with a VM instance 120A-120N. The VM monitor 118 can assign memory address ranges to virtual components within the memory allocated to a VM instance and thus, can add memory to the virtual memory of the VM instance.

The virtual components represent a set of virtual functions that can be implemented by VM instances 120A-120N. The virtual components can provide virtual I/O functions that emulate the I/O functions of hardware computing devices found in a physical computing device. For example, the virtual components can correspond to I/O device types such as the real time clock (RTC), storage controller, network interface (NIC) controller, programmable interrupt controller (PIC), peripheral component interconnect (PCI) bus, disk controller, small computer system interface (SCSI) controller, floppy drive, keyboard and mouse ports, monitor ports, serial ports, keyboard controller, industry standard architecture (ISA) bus, and other I/O devices. The virtual components are sometimes referred to as "peripherals." In a virtual computing environment, not every function needs to be virtualized for every machine. The VM monitor 118 can determine which I/O devices need to be virtualized based on the configuration of the VM instance. The physical computing device 100 may be further configured to emulate other virtual components or peripherals, including memory, as would be understood by a person of skill in the relevant art.

In addition to the functionality implemented by the virtual I/O components, the various virtual components can be configured as to the specific communication protocols utilized by the instantiated VM instances 120A-120N to access the I/O functionality. More specifically, in one embodiment, some of the virtual I/O components may correspond to a Port I/O communication protocol ("Port I/O virtual components") and other virtual I/O components may correspond to a memory-managed I/O (MMIO) communication protocol ("MMIO virtual components").

The physical computing device 100 can be part of a network that includes multiple physical computing devices. One skilled in the relevant art will appreciate that the network is logical in nature and can encompass physical computing devices from various geographic regions. Additionally, the network can include one or more physical computing devices 100 that do not host VM instances.

In some embodiments, the physical computing device 100 can be managed by a centralized management system. For example, a control plane manager (not shown) may be implemented on one or more servers and can be configured to manage the operation and configuration of the physical computing devices on a virtual network as well as select computer systems to host VM instances or send launch instructions to a manager program that runs in Domain-0. In some embodiments, the control plane manager can communicate directly with the VM monitor 118. For instance, a control plane manager may comprise a software program configured to generate a set of instructions that determine how a VM monitor 118 ought to configure a particular VM instance and then may provide those instructions to the VM monitor 118 for execution. For example, the control plane manager can determine configurations, operating parameters, resource allocations within VM instances, for each physical computing device within a virtual network. In some embodiments, the management system can comprise a plurality of control plane managers that control different allocations of physical computing devices. In some embodiments, control plane managers can communicate with an offload device and/or the physical computing device 100 directly.

With the various computing system architectures in place, a computing system executing a number of VM instances may be configured to respond to a system malfunction as known in the art as follows. As shown in the example state diagram of FIG. 2, an example VM instance 220 may include one or more VM processing units 202 and a VM memory 204. As shown, a VM OS kernel 206 and a VM crash kernel 208 may be stored on VM memory 204. A VM monitor is not shown in FIG. 2, but will later be described with respect to FIG. 3.

Figure 2:
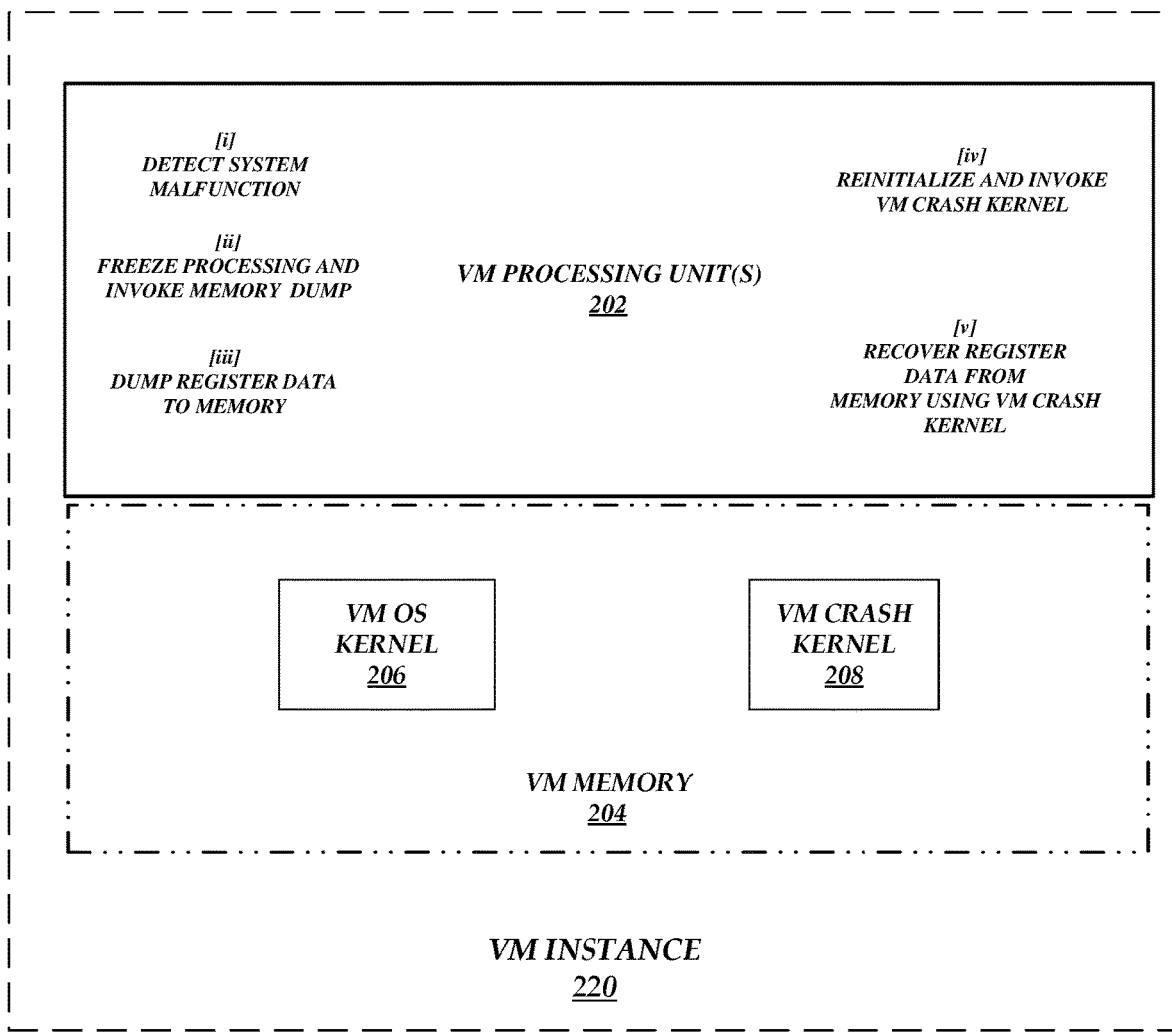
FIG. 2 illustrates a state diagram depicting example actions taken by virtual components of a virtual machine instance of FIG. 1 when the virtual machine instance experiences a system malfunction and attempts to recover from the system malfunction as known in the art.

At the outset, in FIG. 2, the VM processing units 202, executing the VM OS kernel 206, may (i) detect, or otherwise be notified, that a system malfunction is occurring or is about to occur. For example, VM processing units 202 may detect that a double-fault has occurred, which in most instances would be the predecessor to a triple-fault. In such cases, the VM processing units 202, executing the VM OS kernel 206 may perform certain tasks in anticipation of a complete system shutdown, including a dump of the VM processing units' registers as described below. However, any number of system malfunctions may be detected, including different types of faults (e.g., a triple-fault), a crash, invalid opcode, a system panic (e.g., kernel panic), deadlock, or some other detectable system malfunction.

Upon detecting a system malfunction, the VM processing units 202, as part of a recovery protocol provided by the VM OS kernel 206, can (ii) freeze processing. For example, in accordance with the recovery protocol, one, more or all of the VM processing units 202 may stop processing.

Referring still to FIG. 2, the VM processing units 202 may also (iii) invoke a register dump once the VM processing units have stopped processing. The register dump may result from a command or interrupt signal to one or more processors of the VM processing units 202 to systematically store the data in their respective registers to VM memory 204. In one embodiment, a first VM processing unit 202 dumps all of the data in its registers to VM memory 204 and then stops processing. The first VM processing unit 202 may also send an interrupt to a second VM processing unit 202, which will respond by dumping the contents of its registers, sending an interrupt to a third VM processing unit 302, and stopping. This process may continue until all of the VM processing units 202 have dumped their register data to VM memory 204. Once complete, the VM processing units 202 may then (iv) reinitialize and invoke the VM crash kernel 208. As discussed earlier, the VM OS kernel 206 or the VM memory 204 may already be corrupt at this point and may be unable to accomplish this task. Assuming the VM OS kernel 206 is safe, however, the VM processing units 202 may reinitialize and the VM crash kernel 208, which should be located in a protected region of VM memory 204, may be invoked. The reinitialized VM processing units 202 will execute the VM crash kernel 208 to (v) recover the register data from VM memory 204. The recovered register data may be preserved and used to diagnose the system malfunction. For example, recovered register data may be used for debugging purposes.

Figure 3:
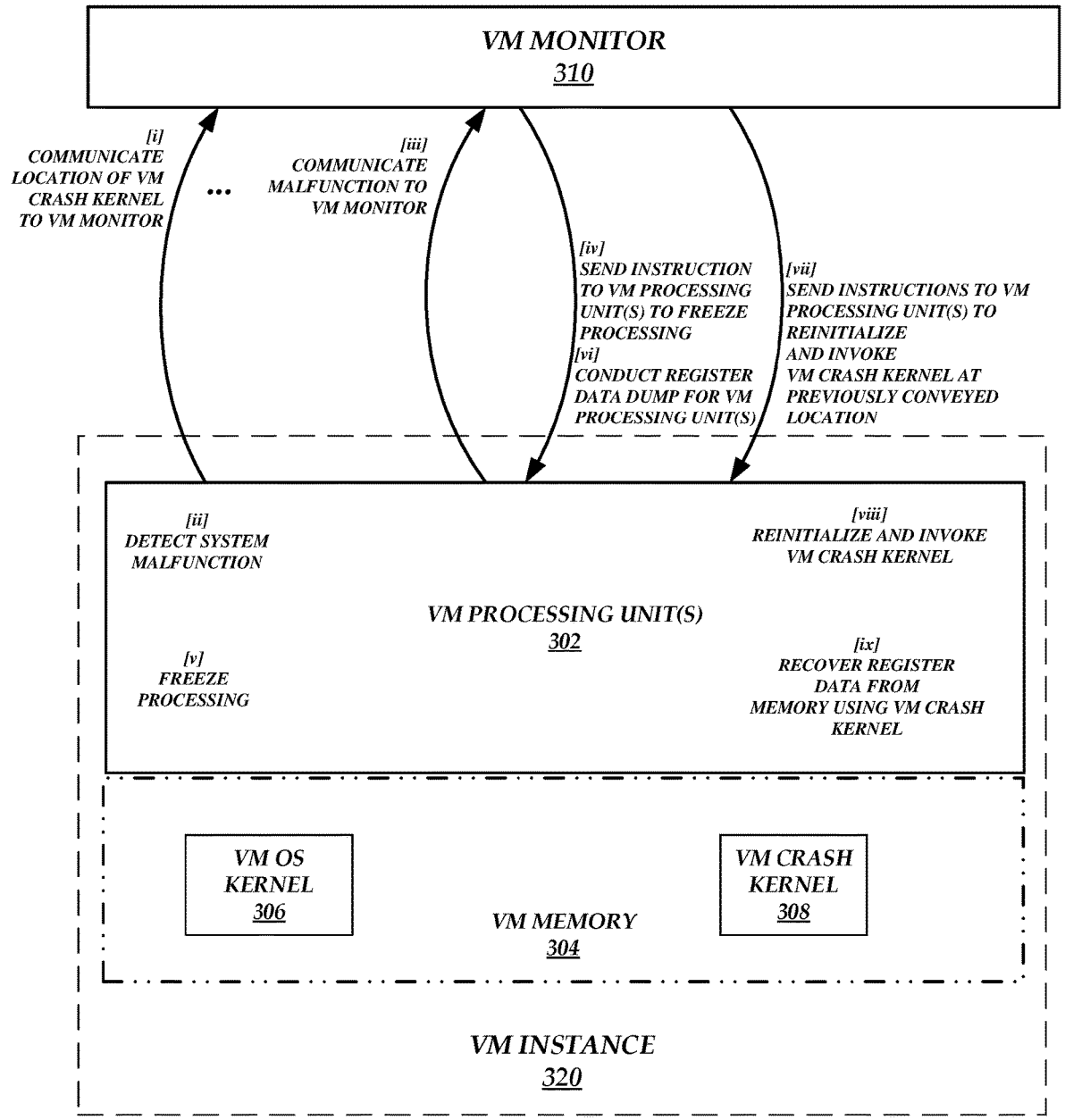
FIG. 3 illustrates a state flow diagram depicting example communications between virtual components of the virtual machine instance and the virtual machine monitor of FIG. 1 when the virtual machine instance experiences a system malfunction and recovers from the system malfunction in accordance with the present disclosure.

Turning to FIG. 3, a VM monitor 310 may be used, such as the VM monitor 118 described with respect to FIG. 1, to provide a better and more reliable recovery protocol over the one described with respect to FIG. 2. In some embodiments, VM monitor 310 may be a hypervisor configured to instantiate one or more VM instances, such as VM instance 320. VM instance 320 may comprise one or more VM processing units 302 (e.g., vCPUs), VM memory 304, VM OS software, such as OS kernel 306, and VM protected software, such as VM crash kernel 308. When VM instance 320 is first instantiated or launched, its VM processing units 302, in accordance with the OS kernel 306, may send a location and start address of VM crash kernel 308 to the VM monitor 310 for future use in case VM instance 320 later experiences a system malfunction. In the illustrated example, VM instance 320 does, in fact, experience a system malfunction and the VM monitor 310 receives an indication of the system malfunction from the malfunctioning VM instance itself. For example, the VM processing units 302, executing the OS kernel 308, may detect a triple-fault or the invocation of another recovery routine (e.g., a kernel panic recovery routine). The VM processing units 302 may then (iii) communicate an indication of the system malfunction to the VM monitor (e.g., via a call, such as a hypervisor call, a message signaled interrupt (MSI), etc.). The indication may notify the VM monitor 310 that the VM monitor 310 is to assume control of the recovery protocol instead of allowing the VM processing units 302 of the VM instance 320 to transition control to the protected program.

In another example (not shown), the system malfunction of the VM instance 320 is detected external to the VM instance, e.g., by another VM instance, by the VM monitor 310 or by another physical computing device. For example, a second VM instance of the physical device hosting the VM instance 320 may detect that a first VM instance is experiencing a system malfunction. For example, the second VM instance may not be receiving an expected communication from the malfunctioning VM instance and may send a malfunction indication to the VM monitor 310. Such an indication may notify the VM monitor 310 that the VM monitor 310 is to assume control of the recovery protocol.

Regardless of whether the VM monitor 310 receives the malfunction indication from the VM instance 320 itself or from elsewhere, the VM monitor 310 may assume control of the recovery protocol on behalf of the malfunctioning VM instance. More specifically, the VM monitor 310 may (iv) instruct the VM processing units 302 of the malfunctioning VM instance 320 to stop or freeze processing. For example, in accordance with the recovery protocol, one, more or all of the VM processing units 302 may (v) stop processing. The VM monitor 310 may invoke an interrupt process for the VM processing units 302, such as an inter-processor interrupt, a non-maskable interrupt (NMI), or some other interrupt configured to freeze processing by one or more of the VM processing units 302. In a non-limiting example, one VM processing unit 302 may be instructed to interrupt another VM processing unit 302 of the VM instance 320. In some embodiments, a VM processing unit 302 may also interrupt a VM processing unit of another VM instance. Alternatively, a VM processing unit 302 may interrupt a physical processing unit of a physical computing device (e.g., physical computing device 100). For example, a VM processing unit 302 may execute a non-maskable interrupt to freeze all physical processing units that are executing on one or more physical computing devices. Those physical computing devices may be in communication via a network link. In systems that implement multiple VM processing units, a first VM processing unit 302 may be instructed to freeze one other VM processing unit 302. Alternatively, the VM processing units 302 may only comprise a single VM processing unit and in such embodiments, only one VM processing unit may be subject to the stop order.

As the VM monitor 310 is instruct the relevant VM processing units 302 to stop processing, the VM monitor 310 may (vi) conduct a register dump of the affected VM processing units 302 of the malfunctioning VM instance 320. The freeze instruction and the register dump may be done in series (e.g., as each VM processing unit 202 is stopped). Alternatively, the VM monitor 310 may wait until all instructed VM processing units 302 have stopped their processing operations before conducting a register dump for the VM processing units 302.

As those skilled in the art will recognize, the registers of the VM processing units 302 are accessible by the VM monitor 310. Accordingly, the VM monitor 310 can perform the register dump on behalf of the VM processing units 301 and systematically write the register data of each VM processing unit 302 to a known memory location. For example, the VM monitor 310 may write the register data to a known location in VM memory 304. Alternatively, the VM monitor 310 may write the register data to a known location in a memory that is separate from the VM memory 304. Alternatively, the known memory location may be in virtual memory of another VM instance. In other embodiments, the known memory location may be a location in the physical memory of the physical computing device 100, a location in physical memory of another physical computing device, such as a network disk drive or a flash drive, etc. In yet other embodiments, the VM monitor 310 may write the register data to a known location in memory that was previously added to the VM memory 304 or physical memory of a physical computing device hosting the malfunctioning VM instance 320. The VM monitor 310 may also store the known location of the stored the register data for subsequent access by reinitialized VM processing units 302 executing the VM crash kernel 308.

Once the register dump is complete, the VM monitor 310 may (vii) instruct the VM processing units 302 to reinitialize and invoke the VM crash kernel 306 at the location and/or start address the VM processing units 302 previously communicated to the VM monitor 310. In response, the VM processing units may (viii) reinitialize and run the VM crash kernel 306 from the given location and/or start address. In some embodiments, only a first VM processing unit 302 is reinitialized. For example, only the VM processing unit 302 that detected the system malfunction is reinitialized. In other embodiments, the VM processing units 302 are reinitialized in series (e.g., vCPU 0, vCPU 1, etc.) or in parallel.

The VM processing unit 302 may locate the VM crash kernel 308 in the VM memory 304 of the malfunctioning VM instance 320 using the location and the start address provided by the VM monitor 310. The VM crash kernel 308 may be located in the same VM memory 304 where the original VM OS kernel 306 was stored. Alternatively, the VM crash kernel 308 may be located in separate VM memory for a separate VM instance. In a non-limiting example, the same VM crash kernel 308 program may be replicated and stored across multiple VM memory devices and/or across multiple instantiated VM instances. In such embodiments, the VM processing unit 302 may locate the VM crash kernel 308 in an instance of VM memory that is separate from the instance of VM memory 304 of the malfunctioning VM instance 320. In another embodiment, the VM crash kernel 308 may be located in a separate region of memory 304 located elsewhere on the physical computing device 100 or on a separate computing device altogether.

The (ix) execution of crash kernel 308 may allow the VM processing units 302 to recover the register data that was stored as part of the register dumps performed by the VM monitor 310. In some embodiments, a reinitialized vCPU may load and run the VM crash kernel 308 from the known location in VM memory 304. The VM processing unit 302 running the VM crash kernel 308 may then unwind the stack of the register data to determine the state of the VM processing unit 302 prior to or during the system malfunction. The VM processing unit 302 may also read out the register data to a separate computing device or to the physical computing device 100 for subsequent analysis or debugging. In some instances, the VM monitor 310 may be able to reinitialize other peripherals of the VM instance 320 based at least in part on the recovered register data. In other instances, a user may need to interrogate the VM memory 304 of the VM instance 320 to retrieve the memory contents. For example, the VM processing unit 302 may be unable to run the VM crash kernel 308 and as such, a user may need to manually locate the VM crash kernel 308, load it into another VM processing unit 302 that can run the VM crash kernel 308 and allow the other VM processing unit 302 to recover the register data.

Example embodiments and extensions of embodiments will now be described with respect to FIGS. 4-6. These are meant only to provide various example logical flows that may be implemented, alone or together, but are not meant to be limiting to any specific method. A person of skill in the relevant art will understand that various combinations of the following flow diagrams along with the descriptions of FIGS. 1-3 may be implemented without departing from the spirit of the scope of the disclosed technology.

Figure 4:
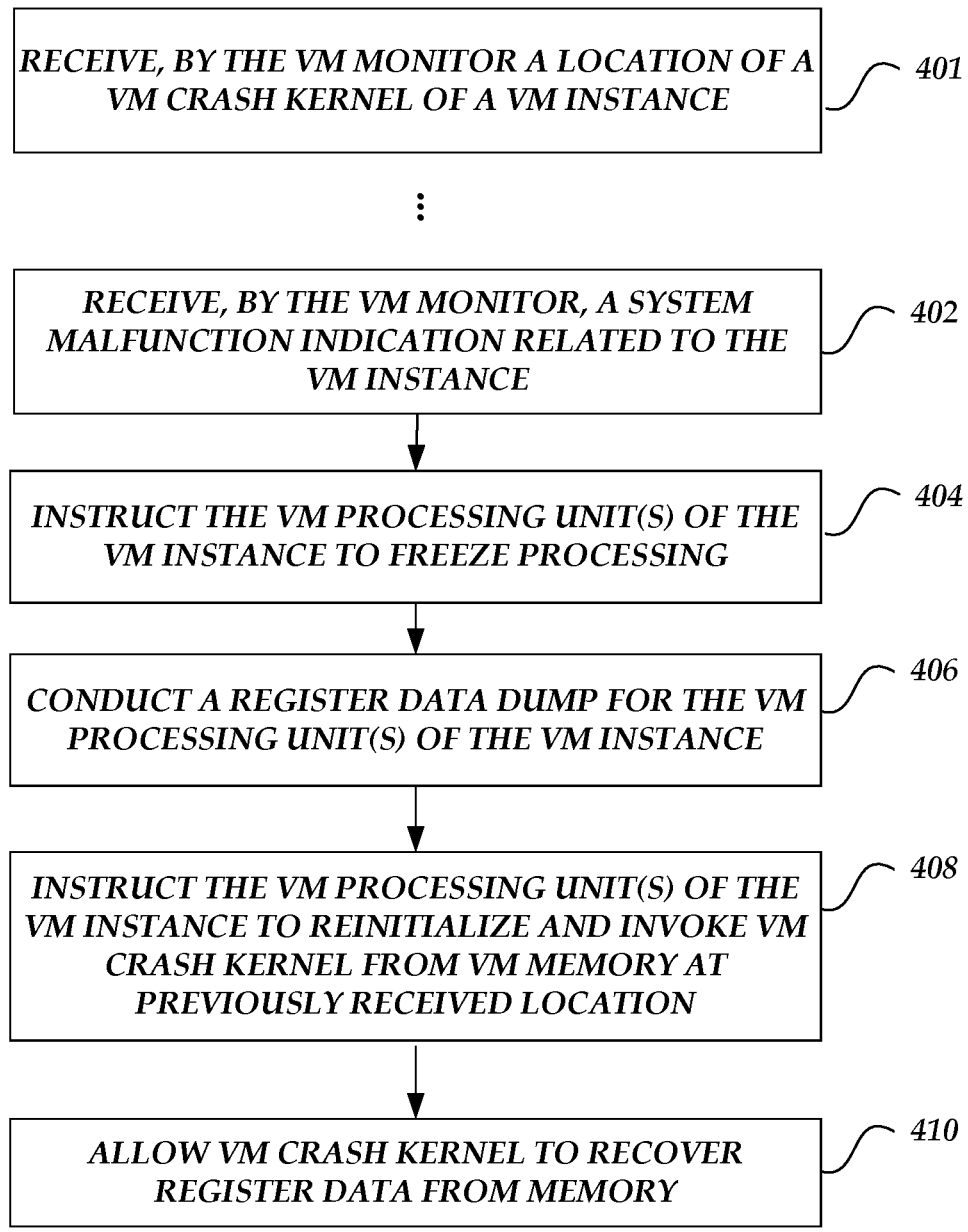
FIG. 4 illustrates an example flow diagram of a recovery protocol implemented by the virtual machine monitor shown in FIGS. 1 and 3 when the virtual machine instance experiences a system malfunction.

FIG. 4 depicts an example flow diagram of a recovery protocol implemented by a VM monitor to enable recovery of a VM instance from a system malfunction in a virtual machine environment, according to certain embodiments described herein. The protocol can be implemented by the VM monitor in communication with components of one or more VM instances.

At block 401, the VM monitor may receive a location, including a start address, of a VM crash kernel of a VM instance being managed by the VM monitor. The VM instance may send the location of its VM crash kernel to the VM monitor upon its initial launch or instantiation so that the VM monitor may use it if the VM instance malfunctions in the future.

As illustrated in FIG. 4, at some point later, the VM instance who sent the location of its VM crash kernel, does in fact experience a system malfunction. Thus, at block 402, the VM monitor receives an indication of the system malfunction of the VM instance. As described above, the malfunction may have been detected internally by the VM instance or externally by another VM instance or computing device. The system malfunction may include a likelihood that a system malfunction is expected to occur or upon the actual occurrence of the system malfunction. For example, when a double-fault has occurred, the likelihood of a triple-fault occurring will have increased since a triple fault in most instances will be predicated on the mishandling of a double-fault. In another example, the system malfunction may be an indication that a kernel panic routine has been initiated or that a deadlock has occurred. In a non-limiting example, the malfunctioning VM instance may send an indication to the VM monitor, using a hyper call or a message signaled interrupt (MSI), that a kernel panic fault has occurred.

At block 404, the VM monitor may instruct the VM processing units of the affected VM instance to freeze or stop processing. The VM monitor may instruct one, some, or all of the VM processing units of the VM instance to stop processing. For example, the VM monitor may instruct vCPU 0 and vCPU 2 to stop processing, whereas vCPU 1 may be allowed to continue. In a non-limiting example, vCPU 0 may be instructed to stop and may perform an inter-processor interrupt for vCPU 2 to stop. In yet another example, all of the vCPUs may stop processing.

At block 406, the VM monitor may conduct a register dump of the VM processing units that are being stopped. In a non-limiting example, the VM monitor may write the data from the registers of each VM processing unit being stopped to a known memory location. For example, the VM monitor may write the register data to a known location in the VM memory of the malfunctioning VM instance, a known location in virtual memory of another VM instance, a known location in the physical memory of a physical computing device hosting the VM instance, or to a location in other physical memory such as a network disk drive or a flash drive, etc. In other embodiments, the VM monitor may write the register data to a known location in memory that was previously added to the VM memory of the malfunctioning VM instance.

In conjunction with performing the register dumps, the VM monitor may produce a core file (e.g., a dump file, an executable and linkable format (ELF) file, etc.) that may be included as part of the register dump. In some instances, the VM monitor may only produce a core file after the VM processing units have completely stopped processing. In some embodiments, a VM monitor may store the core file to the known location. In a non-limiting example, the VM monitor may generate an ELF file that contains the last known register data of a VM processing unit and then store the ELF file to the known location.

After storing the register data to the known location, the VM monitor may, at block 408, instruct the VM processing units to reinitialize and invoke the VM crash kernel at the location and start address previously communicated to the VM monitor. Once reinitialized or during reinitialization, the VM processing units can access and run the VM crash kernel from the provided location and start address. In some embodiments, the VM processing units may reinitialize its peripherals as well. At block 410, the VM monitor allows the VM processing units to run the VM crash kernel and recover the register data from the known location at which it was stored by the VM monitor.

In some embodiments, the VM monitor may receive an indication from the VM instance that the VM instance has successfully located and executed the VM crash kernel. The VM monitor may also receive periodic indications that the recovery protocol is executing successfully (e.g., that the VM processing units have been reinitialized and/or the VM processing units are recovering register data).

Figure 5:
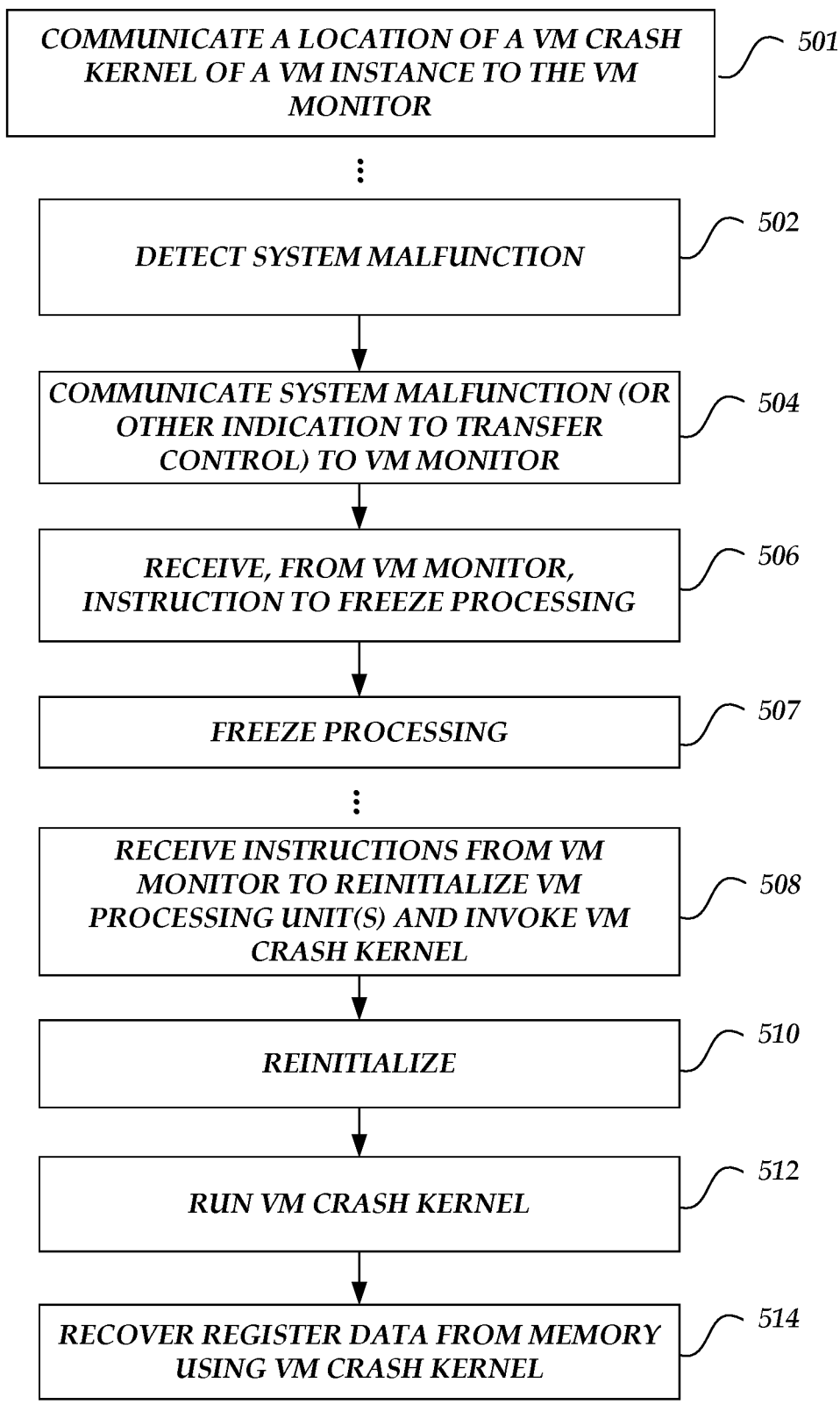
FIG. 5 illustrates an example flow diagram of a recovery protocol implemented by the virtual machine instance shown in FIGS. 1 and 3 when the virtual machine instance experiences a system malfunction.

FIG. 5 depicts an example flow diagram of the recovery protocol implemented by the VM instance to recover from a system malfunction in a virtual machine environment, according to certain embodiments described herein. The protocol can be implemented by the components of one or more VM instances in communication with a VM monitor.

At block 501, a VM instance may send a location, including a start address, of it is VM crash kernel to a VM monitor. The VM instance may send the location of its VM crash kernel to the VM monitor upon its initial launch or instantiation so that the VM monitor may use it if the VM instance malfunctions in the future. As illustrated in FIG. 5, at some point later, the VM instance who sent the location of its VM crash kernel, does in fact, detect at block 502 that it is experiencing a system malfunction. Thus, at block 504, the VM instance that detected the system malfunction may communicate an indication of the system malfunction to the VM monitor. Although in the illustrated example, the VM instance itself detects that it is malfunctioning, in other examples, the malfunction may have been detected externally by another VM instance or computing device. Regardless, the indication may notify the VM monitor that the VM monitor is to resume control of the recovery protocol instead of allowing the malfunctioning VM processing units of the VM instance to transition control to a protected program, such as a VM crash kernel.

At block 506, the VM processing units may receive, from the VM monitor, instructions to freeze or stop processing. At block 507, one, some, or all of the VM processing units of the malfunctioning VM instance may stop processing. For example, vCPU 0 may stop processing first, followed by vCPU 2 and so on. One skilled in the art will appreciate from the above descriptions of FIGS. 3 and 4, that once processing has stopped, the VM monitor is in control of the recovery protocol, and accordingly, the register dump of the VM processing units' registers. Once the register dump is complete, the VM monitor may instruct the VM processing units to reinitialize and invoke the VM crash kernel at the location and start address previously provided to the VM monitor. Accordingly, at block 508, the VM processing units receive instructions from the VM monitor to reinitialize and invoke the VM crash kernel from the location and start address. At block 510, the VM processing units reinitialize. As noted above, the VM processing units may reinitialize in series (e.g., vCPU 0, vCPU 1, etc.), in parallel, or in some other manner. Once reinitialized, the VM processing units locate and run the VM crash kernel at block 512 using the given location and start address. At block 514, the VM processing units recover the register data from the known location that was written there by the VM monitor in accordance with the VM crash kernel.

Figure 6:
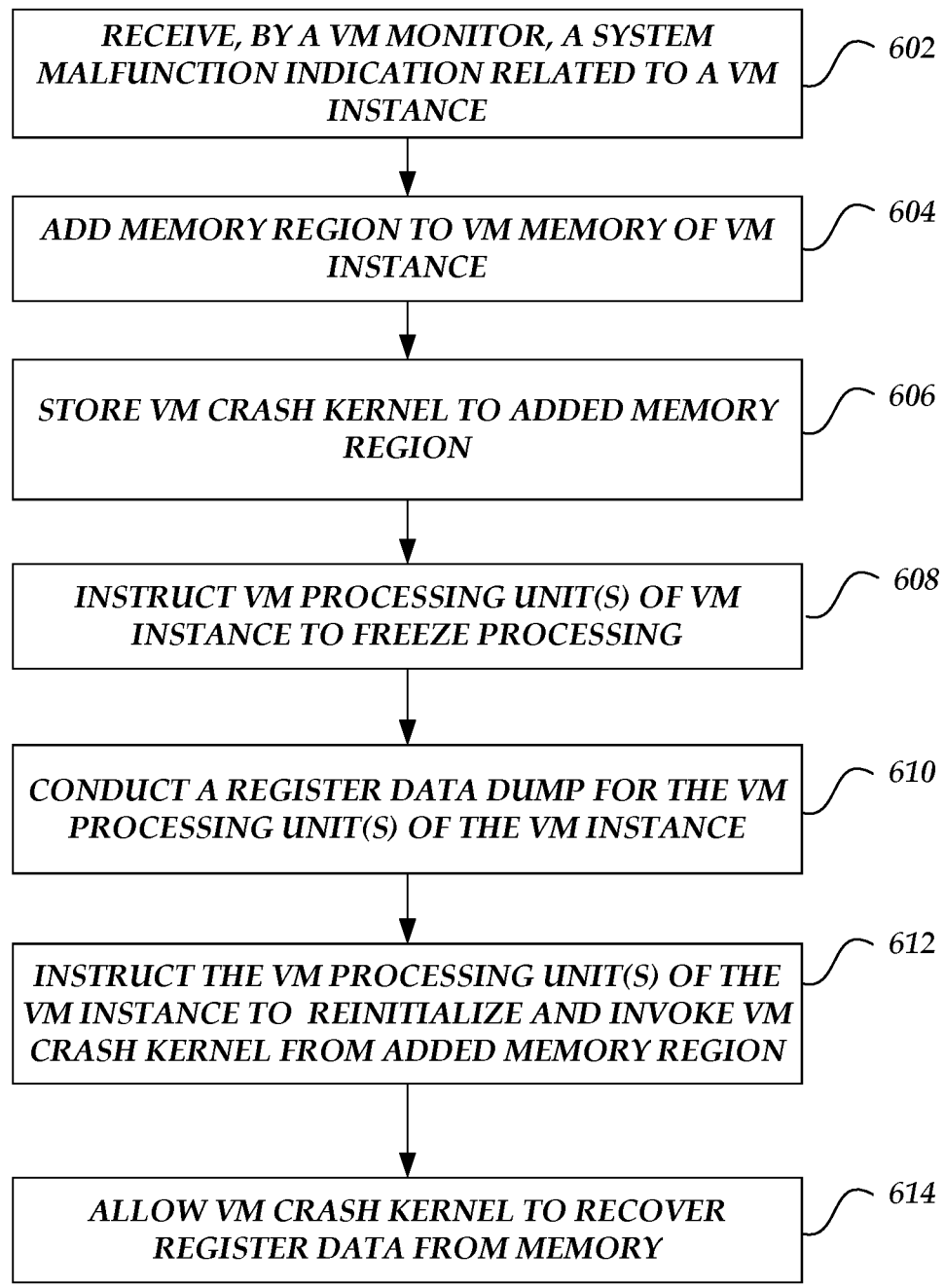
FIG. 6 illustrates an example flow diagram of an alternative recovery protocol implemented by the virtual machine monitor shown in FIGS. 1 and 3 when the virtual machine instance experiences system malfunction.

FIG. 6 depicts an example flow diagram of an alternative recovery protocol implemented by a VM monitor when a VM instance experiences a system malfunction. The alternative recovery protocol can be implemented a VM monitor in communication with components of one or more VM instances and enables the VM monitor to add regions of virtual memory before or during a system malfunction.

At block 602, the VM monitor may receive an indication of a system malfunction in a similar manner to that already described above. At block 604, the VM monitor may add addresses to virtual memory of a VM instance so that the VM monitor can store the register data of the VM processing units of the VM instance at these added addresses or "added memory" in the case of a system malfunction. In some embodiments, the added memory may be located elsewhere, in the virtual memory of another VM instance, or on a separate server or physical storage device. For example, the VM monitor may, before or during a system malfunction, setup added memory on a separate computing device so that the VM monitor can write the register data from the VM processing units of the malfunctioning VM instance there for subsequent analysis. In addition, at block 606, the VM monitor may also store a copy of the VM crash kernel to the added memory. This may provide a technical advantage in cases where the VM crash kernel stored in virtual memory of the malfunctioning VM instance becomes endangered or inaccessible. The VM monitor may perform these actions when a system malfunction is occurring or when a system malfunction is detected as likely occurring. At block 608, the VM monitor may instruct the VM processing units of the affected VM instance to freeze or stop processing and in block 610, the VM monitor may conduct a register dump of the VM processing units that are being stopped. Accordingly, the VM monitor may write the register data of the VM processing units to a known location in the added memory.

Once the register dump is complete, the VM monitor, at block 612, may instruct the VM processing units of the affected VM instance to reinitialize and invoke the VM crash kernel from the added memory. For example, the VM monitor may have stored the start address in the added memory of the VM crash kernel for just such a use. At block 614, the VM monitor allows the VM processing units to run the VM crash kernel located in added memory and recover register data from the known location in added memory to which it was stored by the VM monitor.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid-state storage devices, disk drives, etc.). The various functions disclosed herein may be embodied in such program instructions, or may be implemented in application-specific circuitry (e.g., ASICs) or a field programmable gate array (e.g., FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to an event, such as a triple fault or other system crash. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an ASIC, a FPGA or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the recovery techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide user interface functionality, such as a graphical user interface ("GUI"), among other things.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A physical computing device comprising:
a physical memory configured to store a virtual machine monitor for monitoring a virtual machine instance, wherein the virtual machine instance includes (i) a virtual machine memory storing at least a virtual operating system kernel, and (ii) a virtual processing unit in communication with the virtual machine memory; and
a physical processing unit in communication with the physical memory, wherein the physical processing unit is configured to execute the virtual machine monitor to at least:
receive a malfunction indication for the virtual machine instance; and
in response to receiving the malfunction indication, determine the virtual machine monitor is to control a recovery protocol instead of the virtual operating system kernel;
in response to determining the virtual machine monitor is to control the recovery protocol instead of the virtual operating system kernel:
instruct the virtual processing unit of the virtual machine instance to cease processing;
store register data of the virtual processing unit to a known memory location;
instruct the virtual processing unit of the virtual machine instance to reinitialize; and
instruct the virtual processing unit of the virtual machine instance that has reinitialized to invoke a virtual crash kernel that enables the virtual machine instance to recover the register data from the known memory location.

2. The physical computing device of claim 1, wherein, to instruct the virtual processing unit of the virtual machine instance to invoke the virtual crash kernel, the physical processing unit further is configured to execute the virtual machine monitor to at least instruct the virtual processing unit of the virtual machine instance to invoke the virtual crash kernel without assistance from the virtual operating system kernel.

3. The physical computing device of claim 1, wherein the known memory location comprises at least one of: a location in the virtual machine memory of the virtual machine instance, or a location in a virtual memory of another virtual machine instance.

4. The physical computing device of claim 1, wherein the physical processing unit further is configured to execute the virtual machine monitor to at least:
receive a location of the virtual crash kernel in the virtual machine memory, prior to receiving the malfunction indication for the virtual machine instance, wherein, to instruct the virtual processing unit of the virtual machine instance to invoke the virtual crash kernel, the physical processing unit further is configured to execute the virtual machine monitor to at least instruct the virtual processing unit of the virtual machine instance to invoke the virtual crash kernel from the location of the virtual crash kernel that was received.

5. The physical computing device of claim 1, wherein:
the physical processing unit further is configured to execute the virtual machine monitor to at least provide additional memory to the virtual machine memory,
the known memory location comprises a location in the additional memory, and
the virtual crash kernel is invoked from the location in the additional memory.

6. A computer-implemented method comprising:
receiving, by a virtual resource monitor, an indication of a system malfunction in a virtual computing resource, wherein the virtual computing resource includes (i) a virtual memory storing at least a protected program, and (ii) a virtual processing unit in communication with the virtual memory;
determining, by the virtual resource monitor, that the virtual resource monitor is to control a recovery protocol instead of the protected program;
in response to determining that the virtual resource monitor is to control the recovery protocol instead of the protected program:
instructing, by the virtual resource monitor, the virtual processing unit of the virtual computing resource to stop processing;
writing, by the virtual resource monitor, register data of the virtual processing unit to a known memory location; and
instructing, by the virtual resource monitor, the virtual processing unit of the virtual computing resource to reinitialize and invoke the protected program stored in the virtual memory so that the protected program, when invoked, causes the virtual processing unit of the virtual computing resource to recover the register data written to the known memory location by the virtual resource monitor.

7. The computer-implemented method of claim 6, wherein the virtual processing unit comprises a plurality of virtual processors, and wherein instructing the virtual processing unit to reinitialize comprises instructing a first virtual processor of the plurality of virtual processors to reinitialize.

8. The computer-implemented method of claim 6, wherein the virtual processing unit comprises a plurality of virtual processors, and wherein instructing the virtual processing unit to stop processing comprises instructing a first virtual processor of the plurality of virtual processors to stop processing.

9. The computer-implemented method of claim 6, wherein the virtual processing unit comprises a plurality of virtual processors, and wherein writing, by the virtual resource monitor, register data of the virtual processing unit comprises writing data of a first virtual processor of the plurality of virtual processors to the known memory location.

10. The computer-implemented method of claim 6, wherein the virtual processing unit comprises a plurality of virtual processors, and wherein instructing the virtual processing unit to stop processing comprises instructing each of the virtual processors of the plurality of virtual processors to stop processing.

11. The computer-implemented method of claim 6 further comprising:
prior to receiving the indication of a system malfunction in the virtual computing resource, receiving, by the virtual resource monitor, a location of the protected program in the virtual memory; and
instructing the virtual processing unit of the virtual computing resource to invoke the protected program from the location of the protected program in the virtual memory that was received.

12. The computer-implemented method of claim 6, wherein the known memory location comprises a location in a physical memory accessed directly by the virtual resource monitor and unassociated with any virtual machine instance.

13. The computer-implemented method of claim 6, wherein the indication of the system malfunction in a virtual computing resource is received by the virtual resource monitor from at least one of a physical computing device or another virtual computing resource.

14. The computer-implemented method of claim 6, further comprising
providing, by the virtual resource monitor, additional memory to the virtual memory of the virtual computing resource, wherein the known memory location is in the additional memory, and
the register data of the virtual processing unit is written by the virtual resource monitor to the known memory location in the additional memory.

15. The computer-implemented method of claim 6, wherein instructing, by the virtual resource monitor, the virtual processing unit of the virtual computing resource to reinitialize and invoke the protected program occurs after writing of the register data of the virtual processing unit to the known memory location is complete.

16. The computer-implemented method of claim 6, wherein the protected program comprises a crash kernel.

17. A computer-implemented method comprising:
sending, by a virtual machine instance including (i) a virtual memory storing at least an operating program and a protected program, and (ii) a virtual processing unit in communication with the virtual memory, a location of the protected program in virtual memory to a virtual machine monitor;
sending, by the virtual machine instance, an indication to the virtual machine monitor that the virtual machine monitor is to control a recovery protocol instead of the protected program;

receiving, by the virtual machine instance, an instruction from the virtual machine monitor in accordance with the recovery protocol to cease processing of the virtual processing unit;

receiving, by the virtual machine instance, an instruction from the virtual machine monitor in accordance with the recovery protocol to reinitialize and invoke the protected program from the location in virtual memory;

causing the virtual processing unit of the virtual machine instance to reinitialize; and causing the virtual processing unit of the virtual machine instance that has reinitialized to invoke the protected program from the location in virtual memory.

18. The computer-implemented method of claim 17 further comprising:

in accordance with the protected program, causing the virtual processing unit of the virtual machine instance that has reinitialized to recover register data of the virtual processing unit that was written to a known memory location by the virtual machine monitor in accordance with the recovery protocol.

19. The computer-implemented method of claim 18 wherein the known memory location comprises at least one of: a location in the virtual memory of the virtual machine instance, a location in virtual memory of another virtual machine instance, or a location in a physical memory.

20. The computer-implemented method of claim 17 further comprising:

detecting, by the virtual machine instance, a system malfunction in the virtual machine instance, wherein the virtual machine instance sends the indication to the virtual machine monitor in response to detecting the system malfunction.

* * * * *